3,706,575
LACTALBUMIN PHOSPHATE AS A REPLACEMENT FOR EGG WHITE

Sharon Ann Broadhead, nee Rulon, Rye, N.Y., assignor to Stauffer Chemical Company, New York, N.Y.
No Drawing. Continuation-in-part of application Ser. No. 606,029, Dec. 30, 1966. This application Sept. 9, 1969, Ser. No. 856,476
Int. Cl. A23j 3/02
U.S. Cl. 99—114     29 Claims

ABSTRACT OF THE DISCLOSURE

Undenatured lactalbumin phosphate has been found to be an effective low cost replacement for egg white in food compositions partially or totally. Particular compositions useful in food formulations include egg white and undenatured lactalbumin phosphate, sugar and lactalbumin phosphate and food formulations normally containing egg white in which all or a portion of the egg white has been replaced by lactalbumin phosphate.

CROSS REFERENCE TO RELATED APPLICATION

This application is a continuation-in-part of applicant's co-pending application Ser. No. 606,029, filed Dec. 30, 1966, now abandoned.

This invention relates to the use of lactalbumin phosphase as a partial or total replacement for egg white in food compositions.

Many baked goods and many preformulated packaged goods for making such items as cakes and pastries utilize varying amounts of egg white. These amounts depend, of course, upon the particular use. For example, breads and certain pastries which are glazed with egg white use relatively little. Angel food cake traditionally uses very large amounts. Other food compositions contain egg white and are not cooked. These include certain sauces and candies. In view of the acute shortage of food which is presently facing the world population and the growing shortage of most food products, such as eggs, it becomes imperative to find replacements for such natural foods when possible.

In the manufacture of various types of cheese, the curds are separated from the whey which is generally disposed of as waste. While relatively small quantities of the waste whey have found utility in animal foods prepared either by spray-drying or used as the whey liquid, the large proportion of this waste has been generally discharged into streams and rivers contributing to the pollution thereof. It is believed, therefore, that the finding of a use for a product from this whey constitutes a major advance.

The precipitation of soluble proteins, such as albumin, with certain condensed phosphates has long been known. This action occurs only in acid media and has been the subject of considerable study, see, e.g., B. Katchman et al., Biochim. et Biophys. A.C.T.A., 14, 445 (1954). Although there is some evidence that this precipitation may involve chemical reaction, it is presently thought to be mainly one of cation-anion interaction. At pH values below their isoelectric point, proteins act as high molecular weight cationic electrolytes, the overall charge of which depends on the exact pH. The higher the molecular weight of the given water-soluble protein, the less of a given phosphate is needed to give a precipitate, and conversely, the higher the molecular weight of the phosphate, the less of a given protein is needed (Katchman et al., ibid.). It is also known that the soluble protein in milk, contained in the milk whey, may be precipitated with long chain phosphates after removal of colloidally dispersed solids (casein).

About one-fourth of all of the proteins contained in milk are solubilized in the whey. The casein may be precipitated from milk by acidification to pH 4.6, by salt precipitation, or by the action of rennet.

The lactalbumin phosphate contained in the improved food compositions of the instant invention has the major proportion of its protein moiety in substantially undenatured water-soluble form. In this regard, it is important to note that a common problem in milk processing is denaturation of the protein. Heat denaturation is most common. The principal results of heat denaturation on whey porteins are a decreased solubility of the proteins in both acid and salt solutions and an increased activity of sulfhydryl groups, see, Jenness, R., Effects of Heat Treatment on Serum Proteins, J. Agr. Food, 75, 1954. Whey proteins are presently thought to be a mixture of α-lactalbumin, and β-lactoglobulin, Advances in Food Research, vol. 10, 1960, pp. 45–49. Whole liquid cow milk has been found to contain from about 0.4 to about 0.5 percent by weight lactalbumin (mean value) and from about 0.11 to about 0.26 percent β-lactoglobulin. In whey these proteins are believed to be present in a ratio of from about 2:1 to about 10:1 lactalbumin to β-lactoglobulin. The effect of heat on β-lactoglobulin is perhaps most pronounced. Changes in whey protein, caused by heat denaturation, have limited its utility in food applications heretofore. The lactalbumin phosphate of the present invention, which contains its protein in an undenatured form, is not so limited and is useful in many applications where denatured protein is unsuitable.

The recovery of protein from whey as phosphate includes both lactalbumin and lactoglobulin. The term lactalbumin phosphate as used herein is intended to include both the lactalbumin and lactoglobulin. These components are generally not separated in their recovery.

In U.S. Pat. 3,269,843 issued Aug. 30, 1966 to McKee and Tucker, it is proposed to utilize LAP as a replacement for non-fat dry milk in baking compositions and comminuted meat products.

It has now been found that undenatured LAP serves effectively as a replacement for egg white. This replacement can be made on a requirements basis broadly from 1:1 to 2:1 lactalbumin phosphate to egg white depending on the formulation and other ingredients utilizing them. Thus, compositions normally containing egg whites can be prepared by admixing the ingredients of the compositions together with an effective amount of a mixture which is functionally equivalent to the egg whites, the mixture comprising undenatured lactalbumin phosphate and/or egg whites. By the term functionally equivalent as used herein, it is intended to include the physical and chemical properties normally attributed to egg whites. Whole eggs have been used in baked goods historically. As various recipes developed, it was found that varying effects could be obtained by separating the yolks from the whites and utilizing them separately. The egg whites at some time in history were found to foam when beaten and impart a very fluffy character to cake compositions. Angel food cake is perhaps the best example of such a product. It was also found that when mixed with a sweetener, such as honey or sugar, and baked, a pastry topping resulted which retained the foam characteristics. Breads not normally containing egg as an ingredient or as a minor ingredient were found to be glazed by coating the surface of the bread with egg white before cooking.

With the advent of freeze-drying in recent years, it was found that both egg whites and yolks could be dried and thereafter stored for an indefinite period of time. It was this discovery which made foods using large amounts of either egg white or egg yolk practical. Until eggs could be commercially separated and dried for storage, the householder preparing a cake requiring the whites from 12 eggs was left in a quandary as to what to do with 12 egg yolks and vice-versa. Pastries requiring such ingredients were accordingly made only infrequently, except by bakeries which made such large quantities in such variety that adequate planning was feasible to reduce waste. Today, dried egg white and egg yolk can be purchased commercially as such or as ingredients in prepackaged mixes.

Lactalbumin phosphate can effectively replace egg white in all such food compositions. The importance of this discovery is enhanced by the fact that the availability of egg products is dwindling with increasing population, and that lactalbumin phosphate is recovered in large measure from whey which has in most instances been discarded as waste, limited amounts being used in animal feeds, as indicated above. It should also be noted that lactalbumin phosphate can replace egg white in either the whole or dried condition and can even be used with eggs essentially alone in such food applications as omelets to enhance the fluffy light character of the food without adversely affecting the flavor.

It is, therefore, believed quite surprising, in accordance with this invention, to find that lactalbumin phosphate serves as a replacement for egg white in cooked compositions and compositions to be cooked normally using or containing egg white either totally, partially, or as a supplement.

The amount of lactalbumin phosphate used in any of the compositions above will generally vary directly or proportionally with the amount of egg white normally used in the applicable food compositions. This amount will, of course, also vary dependent on whether or not the egg white is partially or wholly replaced by lactalbumin phosphate, or used merely as a supplement. For any given composition, however, the lactalbumin phosphate replaces egg white on a weight for weight basis within the range of from 1:1 to 2:1 parts lactalbumin phosphate to parts egg white. While the amount can also be varied to a limited extent by varying the formulation in respect to the other ingredients, preferred ratios have been found to be from about 1.1 to 1 to about 1.7, and most preferred from about 1.2 to 1 to about 1.5 to 1. These preferred ranges are dictated by the ease of replacement without formulation changes in standard recipes when slightly greater amounts of lactalbumin phosphate are used.

When lactalbumin phosphate is used as a supplement to egg compositions, it can be used in an amount of from about 0.01 to about 10 parts by weight based upon the weight of the total egg used. Although amounts of from about 0.1 to about 5.0 are preferred.

Lactalbumin phosphate can be used with egg white in these food compositions in a ratio of from about 0.1 to about 100 parts by weight lactalbumin phosphate to about from 99.9 to about 0 parts of egg white by weight based on dry materials. It has been found, however, that it is more desirable to use from about 90 to about 10 parts lactalbumin to about 10 to about 90 parts egg white.

It has been further found that in addition to replacing egg white in such food compositions per function, lactalbumin phosphate provides to the food composition equal or superior nutritive values. This can be seen from Table I below wherein the approximate respective constituent amino acids of casein, egg white, lactalbumin, lactoglobulin, and lactalbumin phosphate are set forth.

TABLE I
[Units in percent, protein basis]

| | Arginine | Histidine | Iso-leucine | Leucine | Lysine | Methionine | Phenyl-alanine | Threonine | Valine | Tryptophane | Tyrosine |
|---|---|---|---|---|---|---|---|---|---|---|---|
| Casein | 4.1 | 3.02 | 6.6 | 10.55 | 8.60 | 3.17 | 5.72 | 4.17 | 8.24 | 1.17 | 5.63 |
| Egg white | 6.55 | 2.20 | 6.20 | 8.9 | 7.1 | 3.9 | 6.00 | 5.00 | 7.9 | 1.4 | 4.0 |
| Lactalbumin | 4.0 | 2.3 | 7.5 | 12.1 | 10.5 | 2.6 | 5.0 | 6.0 | 6.6 | 2.5 | 5.3 |
| Lactoglobulin | 2.9 | 1.6 | 6.8 | 15.5 | 11.3 | 3.2 | 3.7 | 5.3 | 5.8 | 1.9 | 3.7 |
| Lactalbumin phosphate [1] | 2.16 | 1.26 | 4.38 | 7.92 | 6.42 | 1.68 | 3.48 | 3.48 | 3.78 | 1.38 | 2.8 |

[1] Estimate based on 60% value of combined lactalbumin and lactoglobulin.

The lactalbumin phosphate of the instant application can be succinctly defined as the product produced by "reacting" long chain polyphosphates with liquid whey and drying the resulting precipitate without denaturation of the protein. Suitable long chain polyphosphates are the glassy sodium and potassium metaphosphates of the formulas $(NaPO_3)_x$ and $(KPO_3)_x$, respectively, having an average chain length (represented by $x$) of at least 30. These straight chain inorganic polymers, which are sometimes known as hexametaphosphates, are to be distinguished from the cyclic or ring metaphosphates. Where potassium metaphosphate is used, it is preferable to first react the metaphosphate in solution with a sodium salt such as sodium sulfate, sodium chloride, sodium pyrophosphate, sodium hexametaphosphate (short chain) etc., to improve solubility. Mixtures of sodium and potassium glassy metaphosphates are also suitable for precipitating lactalbumin phosphate. The preparation of undenatured protein methaphophates by reaction between an alkali metal metaphosphate and soluble protein is described in an article by Briggs, David R., The Journal of Biological Chemistry, vol. 134, June 1940, pp. 261–272. After treatment of the whey protein with a glassy metaphosphate by the preferred process of the present invention, the whey is centrifuged to collect a heavy gumlike coagulum of lactalbumin phosphate which is then dried. To prevent denaturation of the protein, the whey temperature is normally maintained below 180° F., preferably below about 160° F. For the same reason, it is preferable to dry the coagulum by spray-drying at low temperatures, although other types of driers, such as drum driers, rotary driers, etc., are also suitable. Recovery of the soluble proteins from the whey is essentially quantitative, with only minor processing losses. The following specific example will further illustrate the preparation of undenatured lactalbumin phosphate.

EXAMPLE 1

To 1400 pounds of bovine whey at 140–180° F. is added 80 pounds of a 10% solution of eight parts sodium metaphosphate and one part potassium metaphosphate. The treated whey is then passed into a De Laval-type centrifuge where a heavy, gum-like coagulum is recovered. The coagulum is then spray-dried and recovered as a white particulate product.

In general, the characteristics and properties of the lactalbumin phosphate produced according to the aforesaid procedure will be somewhat dependent upon processing conditions (temperature, etc.), the pH of the whey, and the chain length of the glassy metaphosphate starting material. As normally produced, the product contains between 40% and 70% protein and between about 15% and 25% phosphate. A preferred lactalbumin phosphate for food applications contains between about 50 and 65% protein. Also, the lactalbumin phosphate will range in pH from about 5 to 7, while a preferred product has a pH of about 6.0. We will now more specifically illustrate the application of undenatured lactalbumin phosphates in various food products.

For purposes of the present invention, all ratios and percentages by weight are based upon the dry weight, i.e., solids of egg albumin or egg white unless otherwise specified. This basis is utilized herein because of the varying amount of egg white in eggs depending upon their size and variety. It should be noted, however, that because of this variation in composition, the undenatured albumin phosphate can be added to whole liquid eggs for purposes of increasing the function produced by the egg white. This can be added to the egg in its normal proportions in varying amounts generally under 10% of the total egg weight. In the examples given below and throughout this specification, all parts and percentages are by weight unless otherwise specified.

Furthermore, in the formulations which are given below, a typical formulation is first given and a weight percent range of ingredients is also given. These recipes can vary as is well known in the art. Egg white can be replaced in these recipes by undenatured lactalbumin phosphate in an amount of from 0.1 to about 100% by weight. In those recipes wherein the formulation is not eventually baked, egg white can be completely replaced or replaced by a very high value without any modification to the recipe or noticeable difference in product appearance and taste. In those cases, however, where the formulation contains a relatively high percentage of egg white and the formulation is eventually to be baked, it has been found desirable to replace up to about 50% by weight as higher amounts may require slight modification of the formula in order to bind the water during the cooking process, although this is not always necessary and acceptable results are obtained even in the absence of such modifications. Minor modifications, however, can improve the aesthetic qualities of the product, i.e, appearance.

When dried egg yolks or egg white are used, they can be used in any percentage ratio dependent upon the individual preparing the mixture. The undenatured lactalbumin phosphate can be present in an amount of from about 5 to about 90% based on the combined weight of lactalbumin phosphate and egg yolk. It is the usual procedure, however, to attempt to approximate the ratio of yolk to white as would occur in normal liquid whole eggs. While the composition of such eggs does vary dependent upon the size and variety of egg, as indicated above, the values given below approximate the average percentage values found in eggs.

| Liquid whole eggs | 26% solids | Percent white | Percent yolk |
|---|---|---|---|
| White, 64% | 12.1 | 7.7 | |
| Yolk, 36% | 50.6 | | 18.2 |

EXAMPLE 2

White cake

The formulation given below is typical of a white cake formula or recipe. The first column designated as quantity in grams is typical of a commercial white cake formulation. The second column is the percentage based on such a formulation. The third column sets forth the percentage range normally found in such formulations. Undenatured lactalbumin phosphate can be used to replace the egg white present in these formulations on the equal weight basis, i.e., 1 to 1, although up to 1 to 2 parts replacement can be used effectively if desired. Similarly, the egg white can be partially replaced within the limits set forth above.

WHITE CAKE FORMULATION

| | Typical quantity (grams) | Percent | General percent range |
|---|---|---|---|
| Sugar | 200.0 | 38.0 | 30–50 |
| Flour | 192.0 | 35.8 | 30–45 |
| Shortening | 94.0 | 17.8 | 6–20 |
| Milk (dry basis) | 19.0 | 3.6 | 1–5 |
| Leavening | 7.2 | 1.4 | 1.0–2.5 |
| Salt | 1.5 | 0.3 | 0.2–1.0 |
| Vanilla (dry basis) | 0.5 | 0.1 | 0.1–1.0 |
| Egg white (dry basis) | 16.0 | 3.0 | 1–6 |
| Total | 530.2 | 100.0 | |

A standard white cake formulation was compounded in the laboratory having the following composition.

| Ingredients: | Percent |
|---|---|
| Cake flour | 40.19 |
| Salt | 1.00 |
| Soda (NaHCO$_3$) | 0.69 |
| Wheat starch (gelatinized) | 2.00 |
| Corn sugar | 0.50 |
| Sodium aluminum phosphate | 0.77 |
| Milled sugar | 44.00 |
| Shortening (hydrogenated vegetable oil) | 9.35 |
| Lactalbumin phosphate | 1.50 |
| | 100.00 |

This formulation was compounded following means generally known to the art, i.e., two egg whites and 300 cubic centimeters of water are added to the dry ingredients which are then mixed for about four minutes at medium speed in a standard household mixer. The batter is placed in two eight inch diameter cake tins and baked at an oven temperature of 350° for a period of from 30 to 35 minutes. In this formulation the egg whites, as indicated from the formulation above, were omitted. The cake prepared containing no egg white, but containing lactalbumin phosphate, had the following characteristics:

| | |
|---|---|
| Batter, specific gravity | 0.89 |
| Volume, cubic centimeters | 1170 |
| Symmetry | +4.00 |
| Specific volume | 3.25 |

These values indicated that this formulation was acceptable even though the egg white had been omitted.

In addition, two additional white cake formulations were compounded in the laboratory. These formulations had the following composition.

| | Percent | |
|---|---|---|
| Ingredients | I | II |
| Cake flour | 40.19 | 40.19 |
| Salt | 1.00 | 1.00 |
| Soda | 0.69 | 0.69 |
| Wheat starch (gelatinized) | 2.00 | 2.00 |
| Corn sugar | 0.50 | 0.50 |
| Sodium aluminum phosphate | 0.77 | 0.77 |
| Milled sugar | 44.00 | 44.00 |
| Shortening (hydrogenated vegetable oil) | 9.35 | 9.35 |
| Lactalbumin phosphate | | 1.50 |
| Non-fat dry milk | 1.50 | |
| Total | 100.00 | 100.00 |

Formulation I and formulation II were each divided into two parts, one part was utilized without the addition of egg and one part of each was utilized with the addition of two egg whites. The cakes were prepared for baking as previously described above and the following characteristics were noted for the cakes.

| Sample | Batter specific gravity | Volume (cc.) | Symmetry | Specific volume |
|---|---|---|---|---|
| I—without egg | 0.87 | 940 | 0 | 2.67 |
| I—with egg | 0.82 | 980 | −6 | 2.70 |
| II—without egg | 0.84 | 1,100 | +2 | 3.12 |
| II—with egg | 0.81 | 1,120 | 0 | 3.09 |

The values shown above indicate that the lactalbumin phosphate was sufficient to impart acceptable structure to the cake without the addition of egg white.

A more direct comparison of the effect of egg white and lactalbumin phosphate in white cake formulation was made by utilizing Formula I immediately above, and preparing the batter as previously described. In one sample, fresh egg whites were used and in the other the fresh egg white was replaced totally with lactalbumin phosphate solids equivalent to the egg white solids and water. The resulting cakes had the following characteristics:

| Sample | Batter specific gravity | Volume (cc.) | Symmetry | Specific volume |
|---|---|---|---|---|
| I—fresh egg white | 0.92 | 1,040 | +4 | 2.73 |
| I—LAP solids in water | 0.93 | 1,110 | +6 | 2.95 |

The values shown above indicate that the cake prepared with lactalbumin phosphate had a slightly greater volume. The cakes looked identical, both having a fine grain.

EXAMPLE 3

Yellow cake

In a similar manner to that described in Example 2, a yellow cake formulation is set forth below. As indicated above, this formulation shows an egg content for a typical formuation and a general formulation.

YELLOW CAKE FORMULATION

| | Typical quantity (grams) | Percent | General percent range |
|---|---|---|---|
| Sugar | 200 | 41.5 | 30–50 |
| Flour | 168 | 34.5 | 30–44.5 |
| Shortening | 65 | 13.3 | 6–20 |
| Milk (dry basis) | 19 | 3.9 | 1–5 |
| Leavening | 7.2 | 1.5 | 1.0–2.5 |
| Salt | 1.5 | 0.3 | 0.2–1.0 |
| Flavor (dry basis) | 1.0 | 0.2 | 0.1–1.0 |
| Egg (dry basis) | 25.0 | 5.0 | 3.0–8.0 |
| Total | 486.7 | 100.0 | |
| Water: | | | |
| From milk | 141 | | |
| From egg | 75 | | |
| Total | 216 | | |

In a comparison study of cakes made with egg white and cakes made with lactalbumin phosphate, replacing the egg white values, yellow base cake mix, similar to that indicated as typical above, were prepared as directed in the mix and baked for 30 and 35 minutes at 350° F. The results of this baking are shown below:

| Sample—yellow base cake mix [1] | Batter specific gravity | Volume (cc.) | Symmetry | Specific volume |
|---|---|---|---|---|
| Egg yolk solids | .77 | 1,075 | −2 | 3.08 |
| With egg white solids | | 1,120 | +2 | 3.19 |
| Egg yolk solids | .78 | 1,040 | +2 | 2.99 |
| With LAP solids | | 1,055 | +2 | 3.07 |

[1] Bake 35 minutes.

The cakes containing undenatured lactalbumin phosphate were compared with those containing the egg white. In respect to the cakes which had been baked for 35 minutes on the basis of volume were just slightly below the cakes containing egg whites. Slight modification of this formulation brings the cakes to a comparable level.

Set forth below are various formulations of food compositions normally utilizing egg white in which undenatured lactalbumin phosphate can be effectively substituted. The replacement can be total or partial, without substantially adversely affecting the resulting food product. These products are prepared by normal procedures available to and known by the art. As indicated above, the egg white replacement by lactalbumin phosphate can be on an equal weight or equal requirement basis or can be as high as a ratio of two parts of lactalbumin phosphate per part egg white. Similarly, when egg white is utilized with undenatured lactalbumin phosphate as when the egg white is partially replaced the percentages of lactalbumin phosphate can be from 0.1 to 100% although it is more preferred to use replacement of from about 5 to about 90% undenatured lactalbumin phosphate and still more preferred to use from about 7 to about 30% replacement.

ANGEL FOOD CAKE FORMULATION

| | Typical quantity (grams) | Percent | General percent range |
|---|---|---|---|
| Egg white (dry basis) | 56 | 12.2 | 8–14 |
| Sugar | 300 | 65 | 58–73 |
| Flour | 96 | 21 | 18–25 |
| Tartar | 6.2 | 1.4 | 1.0–1.8 |
| Salt | 1.5 | .3 | 0.2–0.7 |
| Vanilla (dry basis) | 1.0 | .2 | 0.1–1.0 |
| Total | 460.7 | 100.1 | |
| Water from eggs | 360 | | |

SPONGE CAKE FORMULATION

| | Typical quantity (grams) | Percent | General percent range |
|---|---|---|---|
| Egg yolks (dry basis) | 60 | 16 | 12–20 |
| Egg whites (dry basis) | 23 | 6 | 4.5–7.5 |
| Flour | 96 | 25 | 18–30 |
| Sugar | 200.5 | 52.3 | 44–60 |
| Juice (dry basis) | 1 | 0.3 | 0.2–0.5 |
| Salt | 1.5 | 0.4 | 0.2–0.6 |
| Total | | 100.0 | |

DONUT FORMULATION

| | General percent range |
|---|---|
| Flour: | |
| Soft | } 39–62 |
| Hard | } |
| Sugar | 10–30 |
| Salt | 0–2 |
| Eggs | 0–15 |
| Non-fat dry milk | 0–10 |
| Leavening | .5–3.5 |
| Soya flour or potato flour | 0–8 |
| Emulsifier | 0–2 |
| CMC (or gum) | 0–2 |
| Vegetable oil | 0–18 |
| Cerelose | 0–20 |
| Water | 39–47 |
| Alternatives: | |
| Yeast leavening system | [1] 0–4 |
| French type donut | (2) |

[1] Yeast.
[2] 0% chemical leavening; 0% yeast.

WAFFLE FORMULATION

| | Typical quantity (grams) | Percent | General percent range |
|---|---|---|---|
| 1¼ c. flour | 140 | 25.75 | 20–30 |
| 2 c. baking powder | 7.2 | 1.32 | 1–2 |
| ⅔ t. salt | 4.0 | 0.74 | 0–1.5 |
| 1 t. sugar | 12.5 | 2.30 | 1–3 |
| 1 c. milk | 240.0 | 44.14 | 35–55 |
| 2 egg yolks, beaten thick | 40 | 7.36 | 5–10 |
| 3 shortening, liquid | 40 | 7.36 | 5–15 |
| 2 egg whites, beaten stiff | 60 | 11.04 | 5–20 |
| Total | 543.7 | 100.00 | |

POUR BATTER FORMULATION

| | Typical quantity (grams) | Percent | General percent range |
|---|---|---|---|
| Popovers: | | | |
| 1 c. flour | 112.0 | 24.62 | 20–30 |
| ¼ t. salt | 3.0 | 0.66 | 0–1 |
| 2 eggs | 100 | 21.98 | 15–30 |
| 1 c. milk | [1] 140 | 52.75 | 45–60 |
| Total | 455 | 100.00 | |
| Cream puffs: | | | |
| ½ c. water | [1] 120 | 36.98 | 30–45 |
| ¼ c. shortening | 47 | 14.48 | 10–20 |
| ¼ t. salt | 1.5 | 0.46 | 0–1 |
| ½ c. flour | 56 | 17.26 | 10–25 |
| 2 eggs (30%): | | | |
| White, 60 | } 100 | { 18.49 } | 20–40 |
| Yolk, 40 | | { 12.33 } | |
| Total | 324.5 | 100.00 | |

[1] Cubic centimeters.

BATTER BREAD (SPOON BREAD) FORMULATION

| | Typical quantity (grams) | Percent | General percent range |
|---|---|---|---|
| 1 c. cornmeal | 146 | 13.74 | 10-15 |
| 2 c. water, boiling | [1]480 | 45.19 | 35-60 |
| 1 c. milk | [1]240 | 22.59 | 15-30 |
| 1 t. salt | 12 | 1.13 | 0-2 |
| 3 t. baking powder | 10.8 | 1.02 | .5-1.5 |
| 3 eggs, well beaten [100-200 gm. (14%)]: | | | |
| White, 60-120 | 90 | 8.47 } | 10-20 |
| Yolk, 40-80 | 60 | 5.65 } | |
| 2 t. fat | 23.5 | 2.21 | 1-3 |
| Total | 1,062.3 | 100.00 | |

[1] Cubic centimeters.

SWEET DOUGH (DINNER ROLLS) FORMULATION

| | Typical quantity (grams) | Percent | General percent range |
|---|---|---|---|
| 2 cakes yeast (57.) with ¼ c. water 80-85° F | 60 | 5.31 | 3-7 |
| 1 c. milk, lukewarm | 240 | 21.22 | 15-25 |
| ½ c. sugar | 100 | 8.84 | 5-12 |
| ¼ c. shortening | 47 | 4.16 | 2-6 |
| 2 t. salt | 24 | 2.12 | 0-3 |
| 2 eggs: | | | |
| White, 60 | 100 { | 5.31 } | 5-15 |
| Yolk, 40 | | 3.54 } | |
| 5 c. flour, approx | 560 | 49.51 | 40-60 |
| Total | 1,131 | 100.00 | |

BROWNIES FORMULATION

| | Typical quantity (grams) | Percent | General percent range |
|---|---|---|---|
| 2 sq. chocolate | 57 | 10.48 | 5-15 |
| ⅓ c. fat, melted | 73 | 13.42 | 10-16 |
| 2 eggs, beaten (18%) | 100 { | 11.03 } | 15-25 |
| | | 7.35 } | |
| 1 c. sugar | 200 | 36.75 | 30-40 |
| ½ t. salt | 3 | 0.55 | 0-1 |
| ½ c. flour | 56 | 10.29 | 5-15 |
| ½ c. nuts, chopped | 50 | 9.19 | 5-12 |
| 1 t. vanilla | 5 | 0.92 | 0-1.5 |
| Total | 544 | 100.00 | |

CHOCOLATE COCOANUT MACAROONS FORMULATION

| | Typical quantity (grams) | Percent | General percent range |
|---|---|---|---|
| 2 egg whites | 61.0 | 12.38 | 8-16 |
| ¼ t. salt (1.5 gm.) | 1.5 | 0.30 | 0-15 |
| ⅛ t. cream of tartar | 0.4 | 0.08 | 0-1 |
| ½ c. sugar (100 gm.) | 100.0 | 20.29 | 10-30 |
| 1 t. vanilla | 5.0 | 0.10 | 0-.2 |
| 6 oz. package semisweet, melted | 170 | 34.49 | 30-40 |
| 1½ c. cocoanut, shredded | 130 | 26.38 | 20-30 |
| ¼ c. nuts, chopped (optional) | 25 | 5.07 | 2-8 |
| Total | 492.9 | 100.00 | |

BOILED FROSTING FORMULATION

| | Typical quantity (grams) | Percent | General percent range |
|---|---|---|---|
| 1 c. sugar | 200 | 56.71 | 40-65 |
| ½ c. water | [1]120 | 34.73 | 20-50 |
| ⅛ t. cream of tartar | 0.2 | 0.05 | 0-.01 |
| Few grains salt to taste | | | |
| 1 egg white, beaten stiff | 30 | 8.51 | 5-20 |
| Flavoring to taste | 2.5 | | |
| Total | 352.7 | 100.00 | |

[1] Cubic centimeters.

MERINGUE FORMULATION

| | Grams | Typical percent |
|---|---|---|
| Soft: | | |
| 2 egg whites | 60.00 | 53.57 |
| ⅛ t. salt | 0.75 | 0.67 |
| 4 t. sugar | 50.00 | 44.64 |
| ¼ t. vanilla | 1.25 | 1.15 |
| Total | 112.00 | 100.00 |
| Hard: | | |
| 4 egg whites (½ c.) | 120 | 36.95 |
| ¼ t. salt | 1.5 | 0.46 |
| ¼ t. cream of tartar | .78 | 0.20 |
| 1 c. sugar, granular | 200 | 61.58 |
| ½ t. vanilla | 2.5 | 0.77 |
| Total | 324.78 | 100.00 |

GENERAL FORMULATION

| | Percent range |
|---|---|
| Egg white | 35-55 |
| Salt | 0.45-0.70 |
| Sugar | 40-65 |
| Vanilla | 0.75-1.25 |
| Cream of tartar | 0-0.25 |

UNCOOKED FONDANT FORMULATION

| | Typical quantity (grams) | Percent | General percent range |
|---|---|---|---|
| 1 egg white, unbeaten | 30.00 | 8.31 | 5-10 |
| ½ tbsp. water, cold | 7.5 | 2.10 | 1-3 |
| ¾ t. flavoring | 3.75 | 1.00 | 0-2 |
| 2½ c. sugar, powdered | 320.00 | 88.58 | 75-94 |
| Total | 361.25 | 100.00 | |

DIVINITY FORMULATION

| | Typical Grams | percent percent | General range |
|---|---|---|---|
| 3 c. sugar | 600 | 48.19 | 40-60 |
| ¾ c. corn syrup | 246 | 19.76 | 15-25 |
| ¾ c. water | [1]180 | 14.46 | 10-20 |
| 3 egg whites, beaten stiff | 90 | 7.23 | 5-9 |
| 1 c. nuts | 124 | 9.96 | 5-15 |
| 1 t. vanilla | 5 | 0.40 | 0-1 |
| Total | 1,245 | 100.00 | |

[1] Cubic centimeters.

COOKED SALAD DRESSING FORMULATION

| | Grams | Typical percent | General percent range |
|---|---|---|---|
| ¾ t. salt | 4.5 | 1.27 | 0-2 |
| 1 t. mustard | 2.4 | 0.68 | 0-1 |
| 1½ t. sugar | 18.75 | 5.29 | 2-8 |
| 2 t. flour | 12.74 | 3.60 | 2-5 |
| 1 speck cayenne | | | |
| 1 egg, slightly beaten (14%): | | | |
| White | 30 | 8.47 } | 10-20 |
| Yolk | 20 | 5.64 } | |
| ¾ c. milk or water | [1]180 | 50.79 | 35-65 |
| ¼ c. vinegar | [1]60 | 16.93 | 10-20 |
| 2 t. fat | 26.0 | 7.37 | 4-10 |
| Total | 354.39 | 100.00 | |

[1] Cubic centimeters.

FOAMY EGG SAUCE FORMULATION

| | Typical quantity (grams) | Percent | General percent range |
|---|---|---|---|
| 1 egg white, beaten stiff | 30 | 12.79 | 10-15 |
| ½ c. powdered sugar | 64 | 27.29 | 20-35 |
| ½ t. vanilla | 2.5 | 1.07 | 0-1.5 |
| 1 egg yolk, well beaten | 20 | 8.53 | 5-12 |
| ½ c. cream, whipped | 118 | 50.32 | 40-60 |
| Total | 234.5 | 100.00 | |

BASIC CUSTARD FORMULATION

|  | Typical quantity (grams) | Percent | General percent range |
|---|---|---|---|
| 1 c. milk | 240[1] | 70.00 | 60-80 |
| 2 t. sugar | 25 | 7.30 | 5-10 |
| 1-2 eggs [50-100 gm. (22%)] | 75 | { 13.12 / 8.75 } | 15-30 |
| 1/16 t. salt | 0.38 | 0.11 | 0-1 |
| 1/4-1/2 t. flavoring | 2.5 | 0.73 | 0-1 |
| Total | 342.88 | 100.00 | |

[1] Cubic centimeters.

LEMON CHIFFON FILLING FORMULATION

|  | Typical quantity (grams) | Percent | General percent range |
|---|---|---|---|
| 1 t. gelatin in 1/4 c. water, cold | 60[1] | 7.31 | 5-10 |
| 4 egg yolks, beaten | 80 | 9.75 | 5-15 |
| 1/2 c. lemon juice | 120[1] | 14.62 | 10-20 |
| 1 c. sugar | 200 | 24.37 | 18-30 |
| 1/8 t. salt | 0.75 | 0.09 | 0-1 |
| 4 egg whites, beaten stiff | 120 | 14.62 | 10-20 |
| 1 c. cream, heavy, whipped | 240[1] | 29.24 | 20-40 |
| Total | 820.75 | 100.00 | |

[1] Cubic centimeters.

LEMON PIE FILLING FORMULATION

|  | Typical quantity (grams) | Percent | General percent range |
|---|---|---|---|
| 4 egg yolks, beaten thick | 80 | 16.37 | 10-20 |
| 1 c. sugar | 200 | 40.92 | 30-50 |
| 1/8 t. salt | 0.75 | 0.15 | 0-2 |
| 1/4 c. lemon juice | 60[1] | 12.28 | 8-16 |
| 2 t. butter | 28 | 5.73 | 2-10 |
| 4 egg whites, beaten stiff | 120 | 24.55 | 20-30 |
| Total | 488.75 | 100.00 | |

[1] Cubic centimeters.

LEMON SPONGE PUDDING FORMULATION

|  | Typical quantity (grams) | Percent | General percent range |
|---|---|---|---|
| 3 egg whites | 90 | 10.41 | 5-15 |
| 3 egg yolks | 60 | 6.94 | 4-10 |
| 1/4 t. salt | 1.5 | 0.17 | 0-.5 |
| 3/4 c. sugar | 150 | 17.35 | 12-22 |
| 4 1/2 t. lemon juice | 63[1] | 7.29 | 5-10 |
| 3 t. butter, melted | 42.0 | 4.86 | 3-7 |
| 1/3 c. sugar | 67 | 7.75 | 5-10 |
| 4 1/2 t. flour | 30.92 | 3.58 | 2-5 |
| 1 1/2 c. milk | 360[1] | 41.65 | 35-47 |
| Total | 864.42 | 100.00 | |

[1] Cubic centimeters.

LEMON CREAM FORMULATION

|  | Typical quantity (grams) | Percent | General percent range |
|---|---|---|---|
| 4 egg yolks, slightly beaten | 80 | 18.12 | 15-20 |
| 1/2 c. sugar | 100 | 22.65 | 18-27 |
| 1/4 t. salt | 1.5 | 0.34 | 0-.5 |
| 6 t. lemon juice | 90.0[1] | 20.39 | 15-25 |
| 4 egg whites, beaten stiff | 120 | 27.18 | 20-35 |
| 1/4 c. sugar | 50 | 11.33 | 7-15 |
| Total | 441.5 | 100.00 | |

[1] Cubic centimeters.

As indicated initially, lactalbumin phosphate can serve in the foregoing formulations as a total or partial replacement for egg white. It has been further found that undenatured lactalbumin phosphate can be effectively used with liquid whole egg, or dry whole egg to provide enhanced nutrient value as well as to provide enhanced characteristics of the eggs. One particular area where this is important is in the preparation of omelets. Egg white serves in omelet formulations to provide a light and fluffy character to the combined formula. In respect to liquid eggs from about 0.01 part by weight to about 10 parts by weight based on the total egg of lactalbumin phosphate can be added to enhance the fluffy character and nutrient value of the said omelet. Dried eggs, such as are used in prepared omelet mixes, are available separately as dried egg yolk and dried egg white and can be varied with greater ease. It is possible to replace the egg white partially or totally, i.e., generally in a range from about .1 to about 100% by weight of the original egg white normally present, without impairing the flavor or aesthetic appearance of the cooked omelet. It is preferred, however, to partially replace the dried egg white in an amount of from about 1% to about 50% by weight with undenatured lactalbumin phosphate and yet more preferred to replace it in an amount of from about 10% to about 25% by weight. It is, of course, understood that while most omelet compositions have either added to it or which contain other ingredients such as spices, salt, flavorings and solid ingredients such as mushrooms, cheeses, and meats, the weights and percentages given above relate only to the egg portion of the formulation.

Another area wherein undenatured lactalbumin phosphate can be used to advantage is in the preparation of confectionaries, such as marzipan. Marzipan can be prepared by admixture of about 2 parts volume of ground nut meats (conventionally almonds) with 1/4 part by volume whole egg white and a sufficient amount of powdered sugar to form a stiff workable paste. Dry marzipan mixtures can be prepared utilizing dry egg white proportionally on a solids basis and by blending a small amount of water, cream milk, sour cream or other like liquid.

When a paste of the desired consistency is formed, portions are formed to shape, dusted with powdered sugar and chilled to set and harden.

Undenatured lactalbumin phosphate can successfully replace egg white in such marzipan formulations effectively in amounts up to and including 100%, although it can be used with equal effectiveness as a partial replacement for the egg white.

In the formulations above, and throughout the specification, undenatured lactalbumin phosphate is referred to in certain instances as LAP. This abbreviation is utilized for convenience only.

Similarly, in the above formulations and throughout the specification certain terms are used generically such as gum stabilizers, shortenings and emulsifiers. These ingredients are conventionally known and used in the art. They may be exemplified, however, as follows. Such gums as are normally used in foods include: Carageenin, guar, tragacanth and carboxymethyl cellulose. Shortening includes any of the known animal and vegetable fats and oils such as butterfat, lard, fat renderings, vegetable oil, hydrogenated vegetable oils such as corn oils and other seed oils, peanut oils, cocoanut oil and the like. Emulsifiers which are most commonly used include the mono- and diglycerides of the fatty acids and generally a mixture of such mono- and diglycerides. Leavening agents include yeast and baking powders, such as those containing sodium bicarbonate, and an acid or partial acidic salts, such as sodium aluminum phosphate, sodium acid tartrate, sodium acid citrate, and the like.

Flavorings can be added to the various formulations where desired. Such flavorings are well known to the art and include vanilla, chocolate, spices, nut and fruit extracts and the like.

Baking times and temperatures utilized herein are those generally used in the art. Such temperatures are generally in the range of 300° F. to 400° F. for times of from 60 to 25 minutes respectively and usually in the range of from about 325° F. to 375° F. Reference to conventional cookbooks provides specific times where desired.

Clearly, many variations and modifications are within the scope and spirit of this invention and, therefore, no unnecessary limitations should be implied from the foregoing specification.

What is claimed is:

1. A composition of matter consisting essentially of from about 99.9 to about 5% egg white and from about 0.1 to about 95% undenatured lactalbumin phosphate by weight, based upon the combined lactalbumin phosphate and egg white present.

2. The composition of claim 1 wherein the egg white is present in an amount of from about 90 to about 10% and the undenatured lactalbumin phosphate is present in an amount of from about 10 to about 90% by weight, based upon the combined egg white and lactalbumin phosphate.

3. A food composition consisting essentially of egg yolk and undenatured lactalbumin phosphate.

4. A composition of claim 3 wherein the undenatured lactalbumin phosphate is present in an amount of from about 5 to about 90% based upon the combined weight of lactalbumin phosphate and egg yolk.

5. A composition of claim 3 wherein the food composition is based on dry egg yolk and dry undenatured lactalbumin phosphate.

6. A food composition consisting essentially of egg yolk, egg white and undenatured lactalbumin phosphate.

7. In a food composition normally containing egg white the improvement which comprises a composition serving as a replacement for said egg white normally required, said composition consisting essentially of from about 0.5% to about 100% undenatured lactalbumin phosphate and from about 0 to about 99.5% egg white on a requirements basis of from about 1:1 to about 1:2 parts by weight.

8. The composition of claim 7 wherein the lactalbumin phosphate is present in a replacement amount of from about 5 to about 45% by weight based upon the egg white.

9. The composition of claim 7 wherein the lactalbumin phosphate is present in a replacement amount of from about 5 to about 15% by weight based upon the egg white.

10. In a dry cake mix composition normally containing egg white the improvement which comprises a composition serving as a replacement for said egg white normally required, said composition consisting essentially of from about 0.5 to about 100% undenatured lactalbumin phosphate and from about 0 to about 99.5% dry egg white said percentages being based upon the weight of dried egg white normally required, on a requirements basis of from about 1:1 to about 1:2 parts by weight.

11. In a confectionary type food composition normally consisting essentially of sugar and egg white, the improvement which comprises a composition serving as a replacement for said egg white normally required, said composition consisting essentially of from about 0.5% to about 100% undenatured lactalbumin phosphate and from about 0 to about 99.5% egg white on a requirements basis of from about 1:1 to about 1:2 parts by weight.

12. A confectionary type food composition of claim 11 containing nutmeats as an additional ingredient.

13. In a food composition normally consisting essentially of flour, shortening, milk and egg white, the improvement which comprises a composition serving as a replacement for said egg white normally required, said composition consisting essentially of from about 0.5% to about 100% undenatured lactalbumin phosphate and from about 0 to about 99.5% egg white on a requirements basis of from about 1:1 to about 1:2 parts by weight.

14. In a white cake formulation normally comprising from about 30 to about 50 parts sugar, from about 30 to about 45 parts flour, from about 6 to about 20 parts dry milk, from about 1 to about 5 parts leavening, from about 0.2 to about 1.0 part salt, from about 0.1 to about 1.0 part flavoring and from about 1 to about 6 parts of dry egg white the improvement which comprises from about 1 to about 6 parts of a composition serving as a replacement for said about 1 to about 6 parts of dry egg white, said composition consisting essentially of from about 0 to 99 parts by weight dry egg white and from about 100 to 1 part by weight of undenatured lactalbumin phosphate, on a requirements basis of from about 1:1 to about 1:2 parts by weight.

15. In a dry yellow cake composition normally comprising from about 30 to about 50 parts sugar, from about 30 to about 44.5 parts flour, from about 6 to about 20 parts shortening, from about 1 to about 5 parts dry milk, from about 1 to about 2.5 parts leavening, from about 0.2 to about 1.0 part salt, from about 0.1 to about 1.0 dry flavoring and from about 3 to about 8 parts dry egg white the improvement which comprises from about 3 to about 8 parts of a composition serving as a replacement for said about 3 to about 8 parts dry egg white, said composition consisting essentially of from about 0 to about 99.0 parts dry egg white and from about 100 to about 1 part of undenatured lactalbumin phosphate, on a requirements basis of from about 1:1 to about 2:1 parts by weight.

16. In a method for preparing a composition normally containing egg whites the improvement which comprises replacing the egg white requirement of said composition with an effective amount of a mixture functionally equivalent to said egg whites, said mixture comprising from about 99.5% to about 0% egg white and from about 0.5% to about 100% undenatured lactalbumin phosphate on a requirements basis of from about 1:1 to about 2:1, said percentages being by weight based on the combined weight of said lactalbumin phosphate and said egg white present.

17. The method as recited in claim 16 wherein the egg white is present in an amount of from about 90% to about 10% and the undenatured lactalbumin phosphate is present in an amount of from about 10% to about 90% by weight, based upon the combined egg white and lactalbumin phosphate.

18. The method as recited in claim 16 wherein the undenatured lactalbumin phosphate is present in a replacement amount of from about 5 to about 45% by weight, based upon the weight of the egg white present.

19. The method as recited in claim 16 wherein the undenatured lactalbumin phosphate is present in a replacement amount of from about 5 to about 15% by weight, based on the weight of the egg white present.

20. The method as recited in claim 16 wherein the ingredients of said composition include sugar.

21. The method as recited in claim 16 wherein the ingredients of said composition include sugar and nutmeats.

22. The method as recited in claim 16 wherein the ingredients of said composition include flour, shortening, and milk.

23. In a method for preparing a composition normally containing egg yolks and egg whites the improvement which comprises replacing the egg white and egg yolk requirement of said composition with an effective amount of a mixture functionally equivalent to said egg yolks and egg whites, said mixture comprising undenatured lactalbumin phosphate and egg yolk.

24. The method as recited in claim 23 wherein said mixture further includes egg white.

25. The method of claim 23 wherein the undenatured lactalbumin phosphate is present in said mixture in an amount of from about 5 to about 90% based on the combined weight of the lactalbumin phosphate and egg yolk.

26. The method of claim 23 wherein the mixture is based on dry egg yolk and dry undenatured lactalbumin phosphate.

27. In a method for preparing a dry cake mix composition normally containing egg white the improvement which comprises replacing the egg white requirement of said dry cake mix with an effective amount of mixture functionally equivalent to said egg whites, said mixture comprising from about 99.5% to about 0% egg white and from about 0.5% to about 100% undenatured lactalbumin phosphate, said percentages being by weight based on the combined weight of said undenatured lactalbumin phosphate and said dry egg white.

28. In a method for preparing a white cake formulation normally containing egg whites and in addition normally containing from about 30 to about 50 parts sugar, and from about 30 to about 45 parts flour, from about 6 to about 20 parts dry milk, from about 1 to about 5 parts leavening, from about 0.2 to 1.0 part salt, from about 0.1 to about 1.0 part flavoring and from about 1 to about 6 parts dry egg white the improvement which comprises replacing said egg whites with a mixture functionally equivalent to said egg whites, said mixture comprising from about 0 to about 99 parts by weight dry egg white and from about 100 to about 1 part by weight undenatured lactalbumin phosphate.

29. In a method for preparing a dry yellow cake composition normally containing dry whole egg and in addition normally containing from about 30 to about 50 parts sugar, from about 30 to about 44 parts flour, from about 6 to about 20 parts shortening, from about 1 to about 5 parts dry milk, from about 1 to about 2.5 parts leavening, from about 0.2 to about 1.0 part salt, about 0.1 to about 1.0 part dry flavoring and from about 3 to about 8 parts dry whole egg the improvement which comprises replacing said dry whole egg with a mixture functionally equivalent to said dry whole eggs, said mixture comprising egg yolk and from about 0 to 99 parts dry egg white and from about 100 to about 1 part of undenatured lactalbumin phosphate.

References Cited

UNITED STATES PATENTS

| | | | |
|---|---|---|---|
| 3,356,507 | 12/-967 | Wingerd | 99—139 |
| 3,269,843 | 8/1966 | McKee et al. | 99—94 |
| 2,695,235 | 11/1954 | De Goede | 99—57 |

JOSEPH SCOVRONEK, Primary Examiner

W. BOVEE, Assistant Examiner

U.S. Cl. X.R.

99—57, 92, 94, 113